(12) United States Patent
Guj et al.

(10) Patent No.: US 12,036,766 B2
(45) Date of Patent: Jul. 16, 2024

(54) MULTILAYER PANEL MEMBER

(71) Applicant: Dow Global Technologies LLC, Midland, MI (US)

(72) Inventors: Luca Guj, Horgen (CH); Colmar Wocke, Horgen (CH); Mirella Coroneo, Correggio (IT); Vanni Parenti, Campagnola (IT)

(73) Assignee: Dow Global Technologies LLC, Midland, MI (US)

(*) Notice: Subject to any disclaimer, the term of this patent is extended or adjusted under 35 U.S.C. 154(b) by 45 days.

(21) Appl. No.: 17/597,512

(22) PCT Filed: Sep. 1, 2020

(86) PCT No.: PCT/US2020/048891
§ 371 (c)(1),
(2) Date: Jan. 10, 2022

(87) PCT Pub. No.: WO2021/046023
PCT Pub. Date: Mar. 11, 2021

(65) Prior Publication Data
US 2022/0250354 A1    Aug. 11, 2022

(30) Foreign Application Priority Data
Sep. 6, 2019  (IT) .................. 102019000015740

(51) Int. Cl.
*B32B 15/04* (2006.01)
*B29C 44/32* (2006.01)
(Continued)

(52) U.S. Cl.
CPC .......... *B32B 15/046* (2013.01); *B29C 44/321* (2016.11); *B29C 44/461* (2013.01);
(Continued)

(58) Field of Classification Search
CPC .................................................. B29C 44/461
See application file for complete search history.

(56) References Cited

U.S. PATENT DOCUMENTS

| 4,463,583 A * | 8/1984 | Kruger ............... D06B 19/0094 |
| | | 68/900 |
| 4,572,435 A | 2/1986 | Thompson |
| (Continued) | | |

FOREIGN PATENT DOCUMENTS

| CN | 106626216 A | 5/2017 | |
| DE | 19525664 A1 * | 1/1997 | ........... B29C 44/461 |
| (Continued) | | | |

OTHER PUBLICATIONS

Machine translation DE19525664A1 (Year: 1997).*
(Continued)

*Primary Examiner* — Jacob T Minskey
*Assistant Examiner* — Wayne K. Swier

(57) ABSTRACT

A multilayer foam panel member including: (a) at least one top sheet substrate; (b) at least one bottom sheet substrate; and (c) a middle substrate of foam material disposed inbetween, and integral with, the top and bottom sheet substrates; wherein the foam material is produced by dispensing a reactive foam-forming fluid mixture onto a moving or stationary bottom sheet substrate of a foam manufacturing line; and wherein the foam manufacturing line includes a flexible film fluid dispensing device for dispensing the reactive foam-forming fluid mixture onto the moving or stationary bottom sheet substrate to form a multilayer foam panel member; wherein the middle substrate of foam material of the panel member has improved thermal and mechanical properties; and a process for manufacturing the above multilayer foam panel member.

6 Claims, 7 Drawing Sheets

(51) Int. Cl.
    *B29C 44/46* (2006.01)
    *B29K 75/00* (2006.01)
    *B32B 5/20* (2006.01)

(52) U.S. Cl.
    CPC ............ *B32B 5/20* (2013.01); *B29K 2075/00* (2013.01); *B32B 2250/03* (2013.01); *B32B 2250/40* (2013.01); *B32B 2266/0278* (2013.01); *B32B 2307/304* (2013.01); *B32B 2607/00* (2013.01)

(56) References Cited

U.S. PATENT DOCUMENTS

| | | |
|---|---|---|
| 7,040,555 B2 | 5/2006 | Miinalainen et al. |
| 8,852,691 B2 | 10/2014 | Schoen et al. |
| 9,643,358 B2 | 5/2017 | Lewis et al. |
| 9,718,223 B2 | 8/2017 | Koster |
| 2007/0267443 A1 | 11/2007 | Rub et al. |
| 2009/0098237 A1 | 4/2009 | Itadani et al. |
| 2010/0080900 A1 | 4/2010 | Geraedts et al. |
| 2016/0002428 A1 | 1/2016 | Kuroda et al. |
| 2017/0285619 A1 | 10/2017 | Brennan |

FOREIGN PATENT DOCUMENTS

| | | | | |
|---|---|---|---|---|
| EP | 2860007 A1 | * | 4/2015 | ............ B29C 44/28 |
| GB | 1279007 A | | 6/1972 | |
| JP | 2006142125 A | | 6/2006 | |
| JP | 5154932 B2 | | 2/2013 | |
| JP | 5248816 B2 | * | 7/2013 | .......... B41J 2/17556 |
| JP | 05378680 B2 | | 12/2013 | |
| WO | WO-02055388 A1 | * | 7/2002 | ........... B29C 44/182 |
| WO | 2005118240 A1 | | 12/2005 | |
| WO | 2014117823 A1 | | 8/2014 | |
| WO | 2017121894 A1 | | 7/2017 | |

OTHER PUBLICATIONS

Machine translation JP5248816B2 (Year: 2013).*
Machine translation EP2860007A1 (Year: 2015).*
PCT/US2020/048891 Search Report and Written Opinion with a mailing date of Oct. 19, 2020.
Office Action from corresponding Chinese Application: 202080061388.X mailed Jul. 3, 2023.

* cited by examiner

MULTILAYER PANEL MEMBER

FIELD

The present invention relates to a multilayer panel member; and more specifically, the present invention relates to a foam sandwich multilayer panel member; and a process for manufacturing the panel member.

BACKGROUND

Polymeric foams, in particular polyurethane foams, are well known. In general, the preparation of a polyurethane foam requires the mixing of reactive chemical components, such as a polyol and an isocyanate, in the presence of normally used additives such as a suitable catalyst, a surfactant or cell growth control agent, and a physical and/or chemical blowing agent which permits the blowing of the foam.

In a continuous process for producing a rigid foam, and particularly in the production of rigid foams for manufacturing a foam panel structure, as currently practiced on conventional machines, it is common practice to spread or pour, via a dispenser or dispensing device, a thin layer of a reactive mixture of the foam-forming components, in a liquid state, inbetween a bottom (or lower) sheet substrate (one outer layer) and a top (or upper) sheet substrate (another outer layer) while the substrates are moving for example in a lateral (in a horizontal plane) direction.

Then, as the reactive mixture moves laterally with the bottom sheet substrate, the foam is allowed to start to rise freely, due to the reaction between the chemical components and the effect of the blowing agent, until the expansion of the foam reaches and contacts the top sheet substrate; and the foam forms a panel structure integrally attached to the top sheet substrate and the bottom sheet substrate. The foam in the panel structure is then allowed to cure; and thereafter, the panel structure is cross-sawn into panels. The foam composite panel structure typically includes, for example, a polyurethane resin (PUR) foam core or a polyisocyanurate resin (PIR) foam core. The foam core and outer layers of the panel often are also called sandwich elements or sandwich panels. A common process for the production of a composite panel structure composed of metallic outer layers with a core of foam, as generally described above, includes for example, a double band lamination (DBL) process. And, depending on the type of "facer" (one of the outer layers of the panel) on the panel, DBL can be distinguished, for example, as a rigid-faced DBL (RFDBL) or as a flexible-faced DBL (FFDBL).

As aforementioned, the DBL process apparatus includes: (1) a bottom or lower moving sheet of a desired substrate; (2) a top or upper sheet of a desired substrate; and (3) a dispenser for applying a reactive foam-forming composition, which can be an emulsion, onto the lower moving sheet of the apparatus. And in general the DBL process includes the steps of: (I) providing a reactive foam-forming composition by mixing: (a) a polyol mixture, containing polyols, catalysts, additives and gases, i.e. blowing and nucleation agents, with (b) an isocyanate, to obtain a reactive emulsion wherein the reacting liquids in the emulsion ultimately react to form the final PUR foam or PIR foam inbetween the upper (top) and lower (bottom) sheet substrates; and (II) distributing the above obtained emulsion onto the lower moving sheet of the DBL process equipment via a dispenser (also referred to as the "lay down" step).

As the emulsion is distributed on the lower sheet substrate, the gases (blowing and nucleating agents) nucleate and expand via bubbles leading to the formation of the final foam that fills the gap between the two sheets, which are confined inside the double band. For example, in a DBL process, a dispenser means (or dispensing device) is used to distribute the PUR or PIR emulsion mixture throughout the width of the lower moving sheet where the emulsion reacts and polymerizes between the lower and upper sheets. In a short time, the foam cures to form an integral multilayer (e.g., a three-layer) foamed panel structure. Then, the formed multi-layer foamed structure is cut into blocks or sections (or "panels") of the desired length to form panel products.

Heretofore, panel structures made using dispenser devices produced by conventional processes, such as an injection molding process, suffer from problems such as the panel structure is not provided with a good aesthetic quality of the top facing sheet substrate of the panel or the pane structure is not provided with a uniform or homogenous foam material layer of the panel. It is desired, therefore, to provide a panel member having a good quality foam middle layer and good aesthetic quality of top and bottom facer layers of the panel.

SUMMARY

One general embodiment of the present invention is directed to a multilayer foam panel member including: (a) at least a top sheet substrate; (b) at least a bottom sheet substrate; and (c) a middle substrate of foam material disposed inbetween, and integral with, the top and bottom sheet substrates. In one preferred embodiment, the panel member is produced using a foam production line which incorporates a unique flexible film fluid-dispensing device that dispenses a reactive foam-forming fluid onto the bottom sheet substrate which results in forming a multilayer foam panel member having a homogeneous foam layer and a reduced panel density. Thus, one of the advantages of the process of manufacturing the panel member using the above flexible film fluid-dispensing device is that, by using a flexible film fluid-dispensing device or dispenser during the production of the panel member, a uniform and homogeneous distribution of reactive fluid foam-forming mixture is dispensed on the width of the bottom sheet substrate which leads to the production of a foam layer in the resulting panel article having fewer defects such as voids and bubbles incorporated into the foam layer.

Another embodiment of the present invention includes a process for manufacturing the above multilayer foam panel member using a novel flexible film fluid dispenser, wherein the process for manufacturing the multilayer foam panel member of the present invention includes the steps of: (A) providing at least a first moving bottom sheet substrate and at least a second top sheet substrate; (B) providing a flexible film dispensing device for flowing a foam-forming fluid onto the surface of the first moving bottom sheet substrate; (C) dispensing the foam-forming fluid from the flexible film fluid dispensing device onto the surface of the first moving bottom sheet substrate; (D) allowing the foam-forming fluid to react, as the fluid travels on the moving bottom sheet substrate, for a time sufficient to form a foam material substrate disposed inbetween, and integral with, the first moving bottom sheet substrate and the second top sheet substrate to form a multilayer panel structure; (E) curing the panel structure; and (F) cutting the panel structure of step (E) into a predetermined discrete panel section to form a panel member.

DETAILED DESCRIPTION

Figure 1:
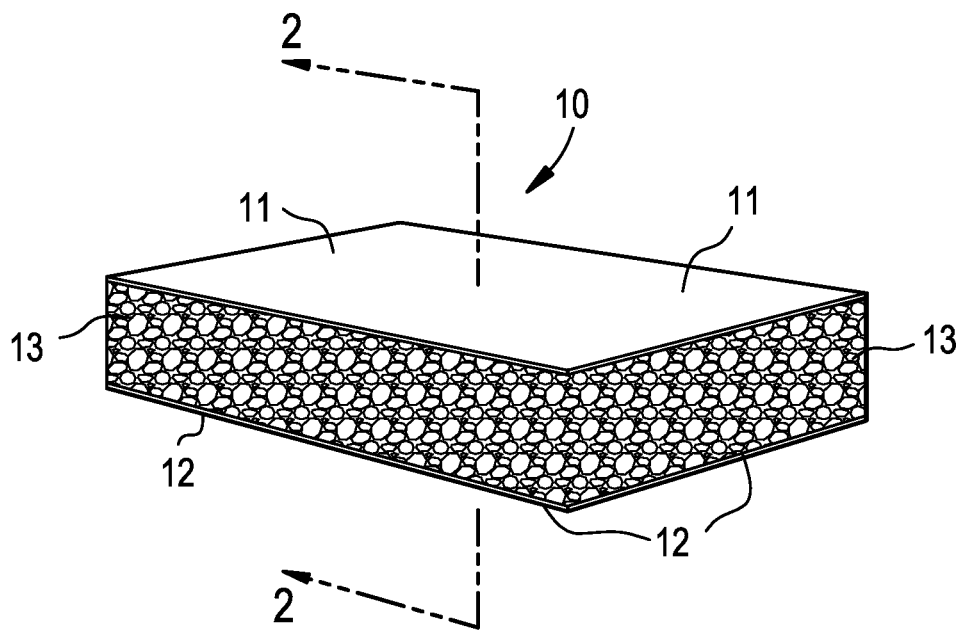
FIG. 1 is a schematic perspective view of a rigid foam multilayer panel member of the present invention.
Figure 2:
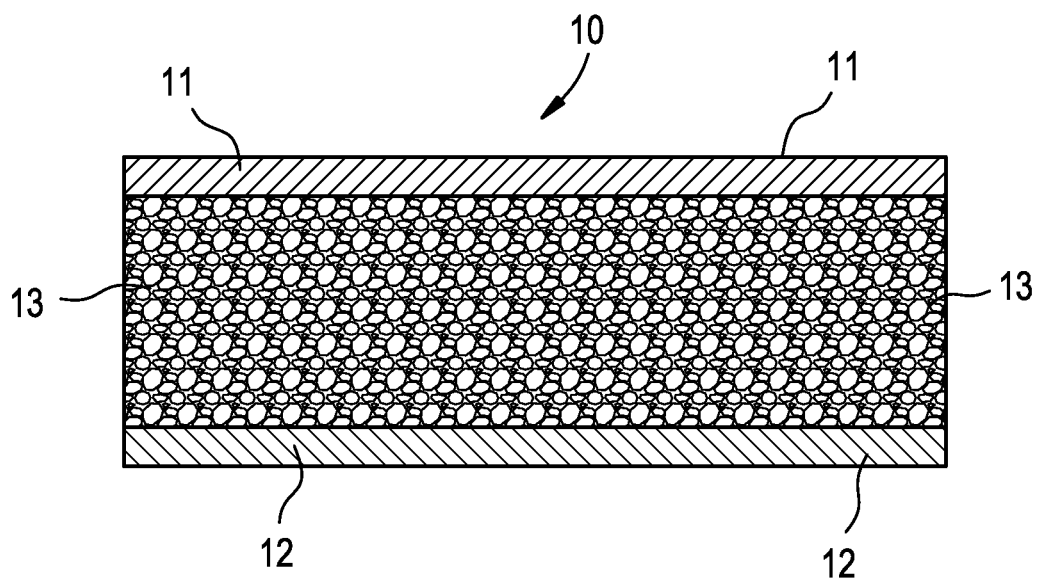
FIG. 2 is a cross-sectional view of the rigid foam multilayer panel member of FIG. 1 taken along line 2-2.

With reference to FIGS. 1 and 2, there is shown one broad embodiment of the rigid foam multilayer panel member of the present invention, generally indicated by reference numeral 10, also referred to herein as a sandwich panel article or member. The panel article 10 includes, for example, a three-layer structure including a top substrate sheet layer 11, a bottom sheet substrate layer 12, and a middle foam material substrate 13 disposed inbetween (i.e. sandwiched between) the top substrate sheet layer 11 and the bottom substrate sheet layer 12; wherein the foam substrate middle layer 13 is integrally attached to the top substrate sheet layer 11 and bottom substrate sheet layer 12 forming the multilayer panel member (structure or article) 10.

Although FIGS. 1 and 2 show a three-layer panel member 10, the present invention is not limited to a three-layer panel member, i.e., the panel member 10 may include three or more layers. For example, the top sheet substrate 11 itself can include one layer (shown in FIGS. 1 and 2) or the top sheet substrate 11 can include two or more layers (not shown). For example, the bottom sheet substrate 12 itself can include one layer (shown in FIGS. 1 and 2) or the bottom sheet substrate 12 can include two or more layers. The panel member 10 can also include one layer of foam material 13 (shown in FIGS. 1 and 2) or the panel member can include two or more layers of foam material (not shown). For example, a separate middle sheet substrate can be disposed at the center of the panel member and inbetween two foam substrate layers thus providing an overall five-layer panel member (not shown).

The top sheet substrate forming the top facing layer 11 can be made of various rigid materials including, for example, a metal substrate (e.g., aluminum or steel); a thermoset polymer; and combinations thereof. For example, the top outer layer used can comprise flexible or rigid, preferably rigid, outer layers, examples being gypsum plasterboard, glass tile, aluminum foils, aluminum sheet, copper sheet, or steel sheet, preferably aluminum foils, or aluminum sheet or steel sheet, particularly preferably steel sheet. The steel sheet can be coated or uncoated sheet. The steel sheet can be pre-treated, for example using corona treatment, arc treatment, plasma treatment, or other conventional methods.

The dimensions of the top facing layer 11 of the panel member 10 including thickness, width and height can vary depending on the application of the panel member. For example, the thickness of the top layer 11 generally can be from 0.1 mm to 0.6 mm in one embodiment, and from 0.2 mm to 0.5 mm in another embodiment. The other dimensions of the top layer 11 including width and height can be any predetermined width or height as desired for the size of the panel member appropriate for the application. For example, the width of the top layer 11 can be from 200 mm to 2,000 mm in one embodiment, from 800 mm to 1,350 mm in another embodiment, and from 900 mm to 1,150 mm in still another embodiment. And, the length of the top layer 11 can be from 1 m to 22 m in one embodiment, from 2 m to 15 m in another embodiment, and from 2 m to 12 m in still another embodiment.

The bottom sheet substrate forming the bottom facing layer 12 can be made of various rigid materials including, for example, any one or more of the materials described above with reference to the top substrate layer 11. The top layer 11 and the bottom layer 12 can be made of the same material or of different materials.

The dimensions of the bottom facing layer 12 of the panel member 10 including thickness, width and height can vary depending on the application of the panel member. For example, the thickness of the bottom layer 12 can be from 0.1 mm to 0.6 mm in one embodiment, and from 0.2 mm to 0.5 mm in another embodiment.

The other dimensions of the bottom layer 12 including width and height can be any predetermined width or height as desired for the size of the panel member appropriate for the application. For example, the width of the bottom layer 12 can be from 200 mm to 2,000 mm in one embodiment, from 800 mm to 1,350 mm in another embodiment, and from 900 mm to 1,150 mm in still another embodiment. And, the length of the bottom layer 12 can be from 1 m to 22 m in one embodiment, from 2 m to 15 m in another embodiment, and from 2 m to 12 m in still another embodiment.

The foam material forming the middle substrate layer 13 of the panel member 10 can be a foam produced from a foam-forming reactive mixture. For example, in one embodiment, the reactive mixture can be a blend of an isocyanate reactant and a polyol reactant to form a polyurethane (PU)-based rigid foam material such as a polyurethane resin (PUR) foam or a polyisocyanurate resin (PIR) foam.

The foam middle substrate layer 13 of the panel member 10 has several advantageous properties including, for example, the foam: (1) is homogeneous, and (2) has a reduced panel density. By "homogeneous" foam, herein it is meant that all the important properties, e.g. thermal conductivity, mechanical strength and density of the foam material 13 in the final panel member 10 can have a normalized standard deviation over the width of the panel from 0% to 15% in one embodiment, from 0% to 10% in another embodiment, and from 0% to 5% In still another embodiment.

In addition, having a more uniform distribution of the foam-forming reactive mixture by the dispenser also allows a manufacturer the capability of reducing the overpacking, and therefore, the final overall density of the panel, which in turn has a beneficial impact on the final cost of the panel. For example, the overpacking of the foam middle layer can be from 0% to 5% in one embodiment, from 5% to 8% in another embodiment, and from 5% to 15% in still another embodiment.

The dimensions of the foam middle substrate layer 13 of the panel member 10 including thickness, width and height can vary depending on the application of the panel member. For example, the thickness of the foam middle substrate layer 13 can be from 20 mm to 300 mm in one embodiment, from 20 mm to 200 mm in another embodiment, and from 40 mm to 200 mm in still another embodiment.

The other dimensions of the foam middle substrate layer 13 including width and height can be any predetermined width or height as desired for the size of the panel member appropriate for the application. For example, the width of the foam middle substrate layer 13 can be from 200 mm to 2,000 mm in one embodiment, from 800 mm to 1,350 mm in another embodiment, and from 900 mm to 1,150 mm in still another embodiment. And, the height of the foam middle substrate layer 13 can be from 20 mm to 300 mm in one embodiment, from 20 mm to 200 mm in another embodiment, and from 40 mm to 200 mm in still another embodiment.

The foam panel member 10 of the present invention can be produced via various continuous and discontiuous processes and equipment. One broad embodiment of the present invention includes a process for manufacturing the above multilayer foam panel member using a novel flexible film fluid dispenser, wherein the process for manufacturing the multilayer foam panel member of the present invention includes the steps of: (A) providing at least a first moving or stationary bottom sheet substrate and at least a second top sheet substrate; (B) providing a flexible film fluid-dispensing device for flowing a foam-forming fluid onto the surface of the first moving or stationary bottom sheet substrate; (C) dispensing the foam-forming fluid from the flexible film fluid-dispensing device onto the surface of the first moving or stationary bottom sheet substrate; (D) allowing the foam-forming fluid to react, on the moving or stationary bottom sheet substrate, for a time sufficient to form a foam material substrate disposed inbetween, and integral with, the first bottom sheet substrate and the second top sheet substrate to form a multilayer panel structure; and (E) curing the panel structure. A continuous process using a moving first bottom sheet substrate includes the additional step of (F) cutting the panel structure of step (E) into a predetermined discrete panel section to form an individual panel member. A discontinuous process using a stationary first bottom sheet substrate includes the steps of (F) using a mold in step (C) and (G) removing the cured panel structure from the mold.

In a preferred embodiment, the process used to produce the panel member 10 of the present invention can include, for example, a continuous process and production line equipment described in Italy Patent Application Serial No. 102019000015728, filed on Sep. 6, 2019 by Dow Global Technologies LLC.

Figure 3:
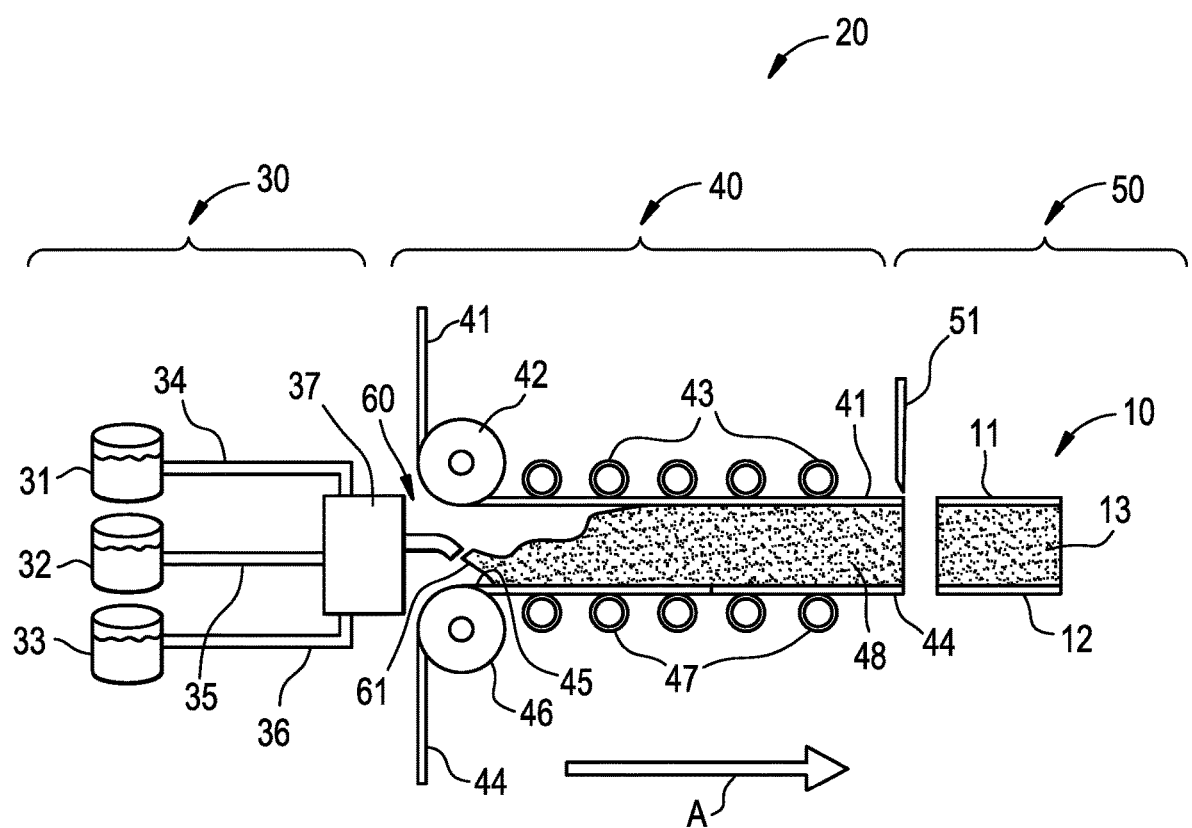
FIG. 3, is a side view of one embodiment of a process flow diagram showing a continuous process for manufacturing the rigid foam multilayer panel member of FIG. 1.
Figure 4:
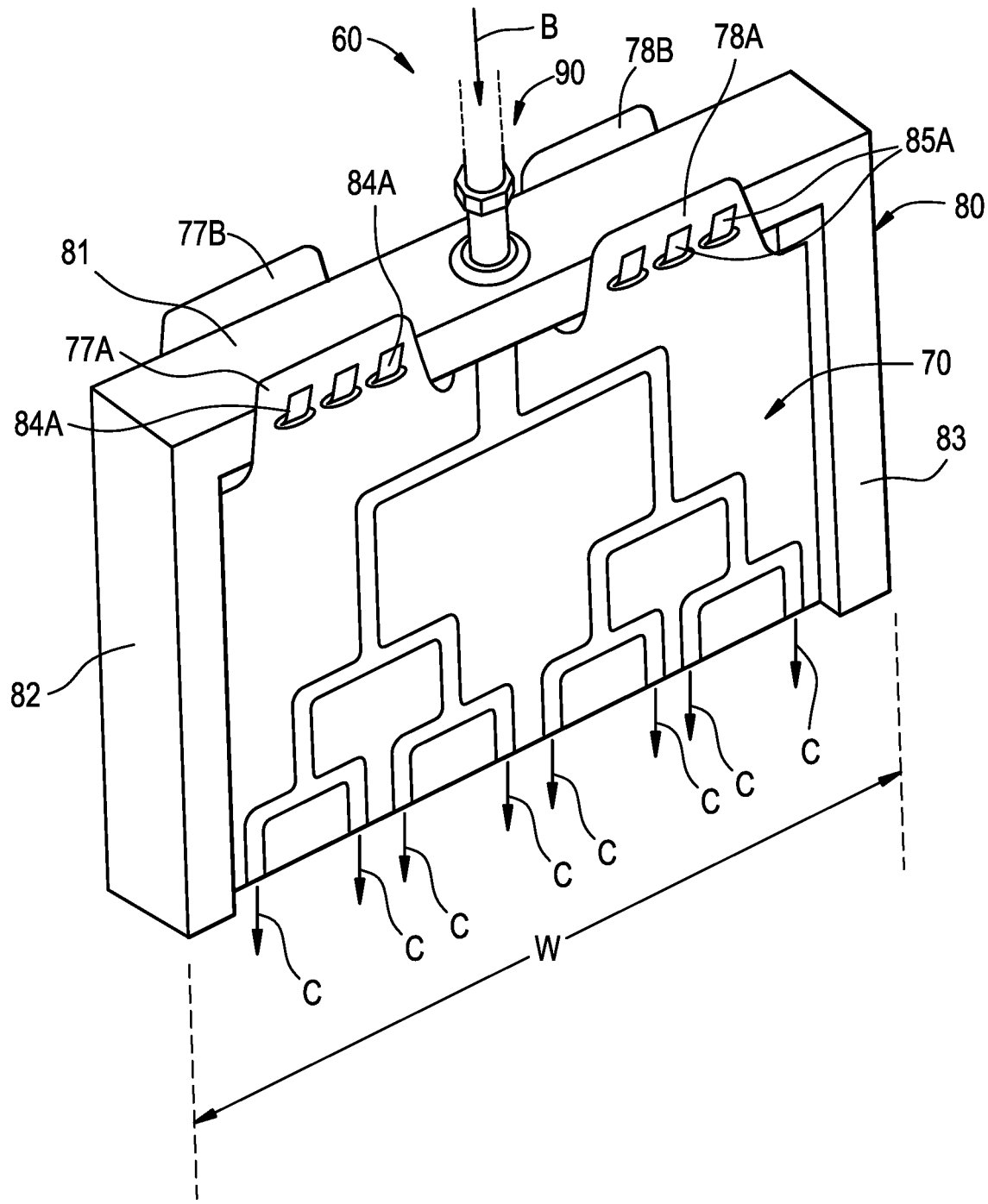
FIG. 4 is a perspective front view of one embodiment of a flexible film fluid-dispensing device useful in the continuous process of FIG. 3.
Figure 5:
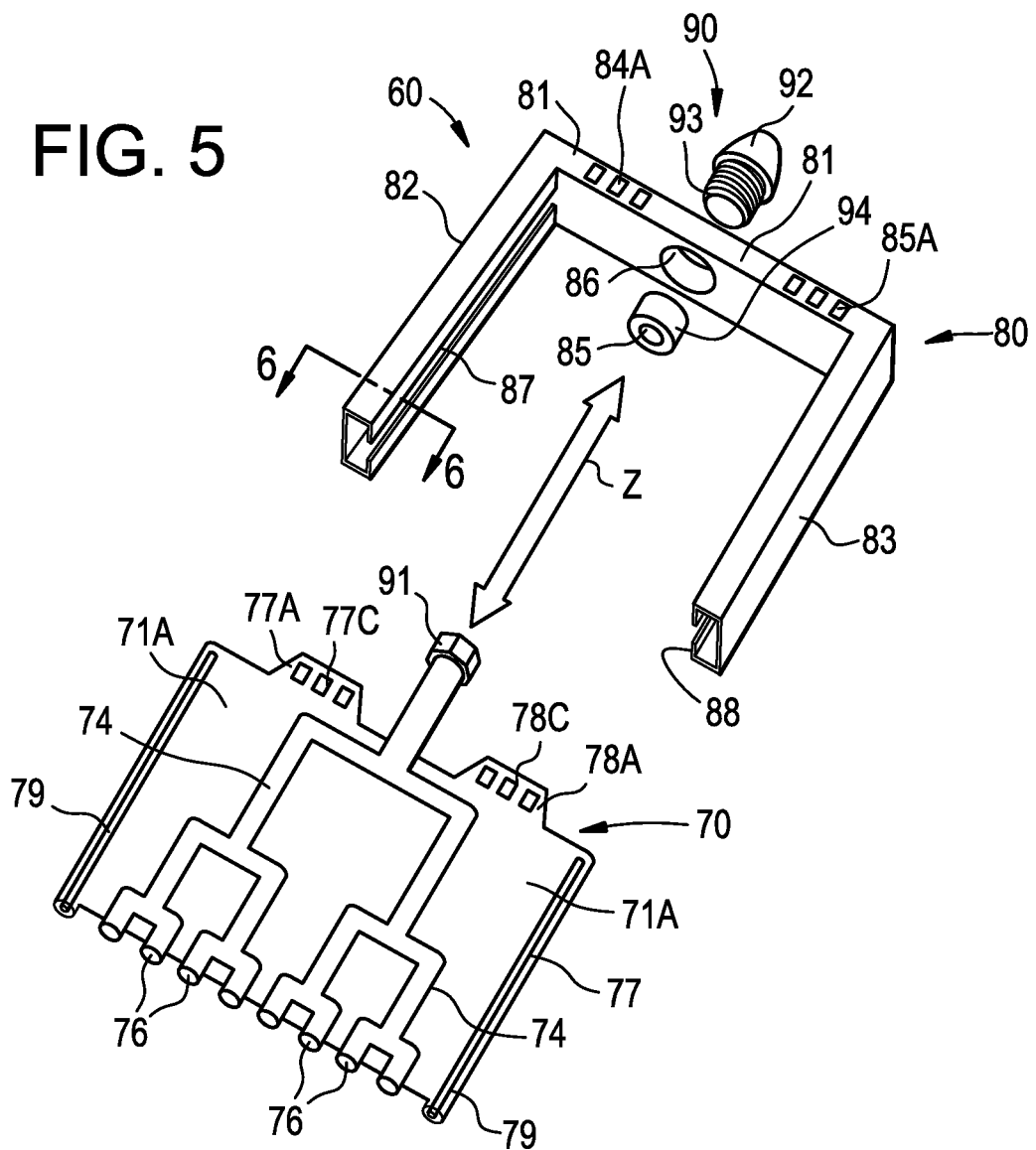
FIG. 5 is a perspective exploded view of the dispensing device of FIG. 4.

An embodiment of a production line and process useful for manufacturing the foam panel members of the present invention is shown in FIG. 3 and described in more detail in the above cited patent application. The production line and process useful for making the panel member 10 of the present invention can be a continuous process or a discontinuous process. For example, the production line and process shown in FIG. 3 is a continuous process. With reference to FIG. 3, and as described in the above cited patent application, there is shown a continuous production line, generally indicated by reference numeral 20, including a material feed section (or reaction mixture production section) generally indicated by reference numeral 30; a foam-forming section (or foam production section), generally indicated by reference numeral 40; and a cutting section (or panel production section), generally indicated by reference numeral 50. In one embodiment, the present invention production line 20 of FIG. 3 can be used for manufacturing the rigid faced foam sandwich panel article or member 10 shown in FIGS. 1 and 2. For example, one embodiment of a continuous production line and process 20 for manufacturing a rigid faced sandwich panel member 10 of the present invention, such as metal-faced foam panels, can include a rigid faced double belt (or band) lamination (RFDBL) continuous production line.

The multilayer foam sandwich panel member 10 produced by the production line 20 includes a top layer 11, a bottom layer 12 and a middle foam layer 13. While the process 20 can include various pieces of equipment and steps known in the prior art for making panel articles, the production line and process 20 differs from the prior art processes by incorporating a novel flexible fluid-dispensing device 60, shown in FIG. 3 and in more detail in FIGS. 4-10. With reference to FIG. 3, there is shown the flexible fluid-dispensing device 60 connected to a mixing chamber 37 which receives a foam-forming fluid reactive mixture from vessels 31, 32, and 33 via pipe lines 34, 35 and 36 respectively, to be dispensed onto the surface 45 of the moving bottom facing layer 44 (bottom layer 12 of panel member 10). The use of the flexible film fluid-dispensing device 60 provides a panel member with fewer defects and a more homogenous foam middle layer 48 (middle layer 13 of the panel member 10) than known processes using a conventional dispenser.

The dispenser 60 useful in the present invention bridges the material feed section 30 and the foam-forming section 40. The cutting section 50 includes a cutting tool 51 to cut the foam panel structure 48 produced in section 40 into discrete panel sections; and the cutting of the panel structure 48 in to sections produces the panel article 10 of the present invention as shown FIGS. 1 and 2. The cut panels 10 can then be forwarded to further processing including, for example, cooling the cut discrete panel sections, stacking the cut discrete panel sections, and wrapping the cut discrete panel sections with shipping film to provide a stack of panel sections for shipping (not shown).

In the continuous process 20 shown in FIG. 3, such as a RFDBL process, which includes the reaction mixture production section 30; the foam production section 40; and the panel cutting section 50, the reaction mixture production section 30 is used to form a foam-forming reactive mixture fluid in the mixing head 37 which is introduced into the foam production section 40 via the dispenser 60 as a reactive mixture fluid 61.

The material feed or reaction mixture production section 30 of the continuous process 20 includes, for example, a multi-component dosing unit comprising several vessels including for example vessels 31, 32 and 33 which contain the foam-forming reactive components to be dispensed; a supply line system such as pipes 34, 35 and 36 connected to the vessels 31, 32, and 33, respectively; a high-pressure mixing head or unit 37 for receiving and mixing the fluid components from the vessels 31, 32 and 33; and the dispenser 60 for dispensing the mixed reactive fluid mixture 61 from the mixing head 37. Auxiliary equipment such as pumps (not shown) are used in the process. The three vessels 31-33, and supply lines 34-36 from vessels 31-33, respectively, of the reaction mixture production section 30 are used for supplying reactive components to the mixing chamber 37 for forming a reactive foam-forming mixture fluid which is then sent to the dispensing device 60 connected to the mixing head or unit 37. The dispensing device 60 can then dispense the reactive mixture 61 from the mixing head 37 uniformly and homogeneously onto the surface of a moving bottom sheet substrate 44 (see FIG. 3), across the entire width of the bottom sheet substrate 44 of the foam production section 40.

The foam-forming or foam production section 40 of the continuous process 20 includes, for example, a top film sheet substrate 41 which moves through the foam production section 40 via a double band 43; and a film bottom sheet substrate 44 which is moved through the foam production section 40 via a double band 47. As the fluid mixture 61 moves across the foam production section 40, the components in the reactive mixture 61 react to form a rigid foam material 48.

The foam-forming reactive mixture 61 is fed to a feed laydown area 45 for fluid 61 exiting the dispenser 60, where the reacting mixture 61 is homogeneously and evenly distributed over the full width of the moving bottom sheet substrate 44. The liquid fluid 61 flowing and being dispensed from the dispenser 60 is "laid down" (i.e. poured) onto the moving bottom sheet substrate 44 and the reactive liquid fluid 61 on the surface of the sheet substrate 44 moves through the length of the foam production section 40 for a sufficient time and at a sufficient speed for the components in the reactive fluid 61 to sufficiently react to form a foam material 48 toward the end of the foam production section 40.

In a preferred embodiment, the reactive fluid 61 is heated. The heat cures the foam-forming mixture 61 and the moving bottom sheet 44 transports the panel structure 48 to the cutting section 50. The panel cutting section 50 is where panels 10 of a desired length are cut. After cutting the panels 10, the produced panels 10 are cooled (not shown) to finalize the curing of the foam layer 13 in the middle layer of the panels 10 before the panels are stacked and packed.

The process of producing a panel member of the present invention can include, for example, a DBL production process used for producing PUR and PIR foam panels. And, in preferred embodiments, the DBL process for fabricating panels can include an RF-DBL and FF-DBL. In the case of a RFDBL process at the beginning of the line there is also a profiling, pre-heating and pre-treating section (not shown) (e.g. corona treatment and deposition of an adhesion promoting layer) of the sheet substrates such as a metal sheet. Typical line speeds for the RFDBL process are from 2 m/min to 30 m/min in one embodiment, from 3 m/min to 20 m/min in another embodiment, and from 4 m/min to 15 m/min in still another embodiment. In the case of a FF-DBL process the line speed can reach, for example, up to 60 m/min in one embodiment.

The continuous process shown in FIG. 3 for manufacturing the foam multilayer panel member of the present invention generally includes, for example, the steps of: (a) providing a flexible film dispenser; (b) attaching the flexible film dispenser to a manufacturing line via a hermetic connector; (c) flowing foam-forming fluid through the dispenser; (d) dispensing the foam-forming fluid from the dispenser onto a moving bottom belt of a bottom or lower sheet substrate; (e) allowing the foam-forming fluid to react, as the fluid travels on the moving belt typically in a horizontal direction, to form a foam inbetween a top sheet substrate (top layer) and the bottom sheet substrate (bottom layer); (f) allowing the foam to contact the top and bottom layers and to fill in the gap between the top and bottom layers, such that the foam is integrally connected to the top and bottom layers forming a panel structure comprising the foam material disposed inbetween the top and bottom layers; and (g) cutting the formed foamed panel from step (f) into predetermined discrete panel sections.

In another embodiment (not shown), the process of the present invention for manufacturing a panel article may include, for example, the steps of: (a) providing a flexible film dispenser; (b) attaching the flexible film dispenser to a mixing head via a hermetic connector; (c) inserting the dispenser in the mold; (d) flowing foam-forming fluid through the dispenser; (e) dispensing the foam-forming fluid from the dispenser into the mold; (f) removing the dispenser from the mold; (g) allowing the foam-forming fluid to react, as the fluid fills the mold, to form a foam inbetween a top sheet substrate (top layer) and the bottom sheet substrate (bottom layer); (h) allowing the foam to contact the top and bottom layers and to fill in the gap between the top and bottom layers, such that the foam is integrally connected to the top and bottom layers forming a panel structure comprising the foam material disposed inbetween the top and bottom layers; and (i) demold the panel.

In still another embodiment of a continuous process, the process for manufacturing the multilayer foam panel member 10 of the present invention shown in FIGS. 1-3 includes, for example, the steps of:

(A) providing at least a top sheet substrate;
(B) providing at least a bottom sheet substrate;
(C) providing a flexible film dispensing device for flowing a foam-forming fluid therethrough;
(D) dispensing the foam-forming fluid from the flexible dispensing device onto the surface of the second bottom sheet substrate;
(E) reacting the foam-forming fluid on the bottom sheet substrate to form a foam material substrate disposed inbetween, and integral with, the first top sheet substrate and the second moving bottom sheet substrate to form a multilayer panel structure;
(F) curing the panel structure; and
(G) cutting the panel structure of step (F) into a predetermined discrete panel section to form a panel member.

In yet another general embodiment of a continuous process, the process of manufacturing the panel member of the present invention can include, for example, the steps of:

(a) providing at least a first top sheet substrate;
(b) providing at least a second moving bottom sheet substrate;
(c) providing a flexible film dispensing device (or flexible dispenser) for dispensing a foam-forming fluid onto the surface of the second moving bottom sheet substrate;
(d) attaching the flexible fluid dispenser to a foam-forming fluid production line, wherein the connection is a hermetically sealed connector;

(e) flowing the foam-forming fluid from the foam-forming fluid production line through the flexible fluid dispenser;

(f) dispensing the foam-forming fluid from the flexible dispenser onto the second moving bottom sheet substrate;

(g) moving the bottom sheet substrate for a sufficient amount of time to allow the foam-forming fluid to react, as the fluid travels on the moving second bottom sheet substrate, wherein the moving second bottom sheet substrate is generally moving in a horizontal direction, to form a foam (middle layer) inbetween the first top sheet substrate (top layer) and the second bottom sheet substrate (bottom layer);

(h) allowing the foam to contact the top and bottom layers and to fill in the gap between the top and bottom layers wherein the foam is disposed inbetween the top and bottom layers;

(i) curing the foam material contacting the top and bottom layers such that the foam is integrally connected to, and forms an integral part of, the top and bottom layers to form a three-layer panel structure comprising a top sheet substrate such as a metal facing sheet, and a bottom sheet substrate such as a metal facing sheet, and a middle layer of the foam material; and (j) cutting the three-layer panel of step (f) into predetermined discrete panel sections forming the final panel member of the present invention.

In even still another embodiment of a continuous process, the process for manufacturing a panel article of the present invention includes, for example, the steps of:

(I) pre-treating the metal facing top and bottom sheets to be attached to the foam, wherein the pre-treatment of the facings can include, for example, one or more of the following pre-treatments: decoiling, corona treatment, profiling, heating, and adhesion promoter layer laydown;

(II) dosing the reactive components of the fluid mixture into a mixing chamber;

(III) high-pressure mixing the components in the mixing chamber to produce the foam-forming fluid reactive mixture (typically, all of the components are mixed in two separate streams and then the two separate streams are combined to form the reactive mixture);

(IV) subjecting the reactive mixture to a laydown method, wherein the laydown method includes:

(i) flowing the foam-forming fluid reactive mixture through a flexible film fluid dispensing device (or dispenser);

(ii) dispensing the foam-forming fluid reactive mixture from the dispenser onto a moving heated conveyor bottom belt of a bottom or lower sheet substrate;

(iii) allowing the foam-forming fluid to react on the surface of the bottom sheet substrate to form a middle foam material substrate inbetween the top sheet substrate (or top layer) and the bottom sheet substrate (or bottom layer);

(iv) allowing the foam to contact the top and bottom layers and to fill in the gap between the top and bottom layers, such that the foam is integrally connected to the top and bottom layers forming a panel structure comprising the middle foam material substrate disposed inbetween the top and bottom layers (also referred to as the facing layers);

(V) cutting the formed foamed panel structure from step (iv) into predetermined discrete panel sections;

(VI) cooling the cut discrete panel sections from step (V);

(VII) stacking the cut discrete panel sections from step (VI); and (VIII) wrapping the stacked panel sections from step (VII) with shipping film to provide a stack of panel sections for shipping.

With reference to FIGS. 4-7, there is shown a flexible film fluid-dispensing device 60 useful in a process for producing the panel member 10 of the present invention. In a preferred embodiment, the above-described dispenser 60 useful in the process for manufacturing the panel member 10 of the present invention can include, for example, the dispenser described in Italy Patent Application Serial No. 102019000015725, filed on Sep. 6, 2019 by Dow Global Technologies LLC.

With reference to FIGS. 4-7, and as described in the above patent application, the flexible film fluid-dispensing device 60 includes, for example: (a) a flexible film liner member, generally indicated by reference number 70; (b) a rigid frame, generally indicated by reference number 80, for holding the flexible film liner member in place; and (c) a connection means, generally indicated by reference number 90, for connecting the flexible film fluid-dispensing device 60 to a mixing chamber (e.g., mixing head 37 shown in FIG. 3).

In one embodiment of the dispenser 60, the flexible film liner 70 which is held in place by the rigid frame 80, includes at least two areas: (i) a flow path area in the form of a pattern of a series of inflatable ducts 74 for allowing a foam-forming fluid reactive mixture (a fluid or emulsion) to flow through the ducts 74; and (ii) a non-flow path area so as not to allow a foam-forming fluid reactive mixture to flow through the ducts 74, thus the non-flow path area directing the flow of fluid reactive mixture through the inflatable ducts 74. The flexible film liner member 70, can be made of one layer or multiple layers. In one preferred embodiment, the flexible film liner 70 of the dispenser 60 useful in the present invention can be, for example, a flexible film liner member described in Italy Patent Application Serial No. 102019000015716, filed on Sep. 6, 2019 by Dow Global Technologies LLC. For example, in the preferred embodiment shown in FIGS. 8-10, the flexible film liner member 70 comprises at least two substrate layers, generally indicated by reference numerals 70A and 70B; and each substrate layer 70A and 70B can be made of at least two film layers. For example, in FIGS. 8-10, there is shown the substrate layer 70A including an outer layer 71A and an inner layer 72A; and the substrate layer 70B including an outer layer 71B and an inner 72B. In the preferred embodiment shown in FIGS. 8-10, at least one layer of each substrate layer (e.g., the inner layer 72A and 72B) is made of heat-sealing material to be heat sealed by a heat-sealing process. For example, the inner layers 72A and 72B are contacted together and then heat sealed together only in certain areas of the film 70 to form heat sealed areas as indicated by bonding line 73E and non-heat sealed areas indicated by layer surfaces 73C and 73D. The heat sealing process creates a flow path in the form of a series of ducts or passageways 74 for fluid to be dispensed from the dispenser 60. Typically, the flow passages 74 are defined by the negative impression of the sealing die when forming the flexible film liner 70. Although not shown, in other embodiments, the substrate layer 70A and 70B can be bonded using an adhesive disposed between the substrate layer 70A and 70B or by incorporating a tie layer disposed between the substrate layer 70A and 70B.

Figure 6:
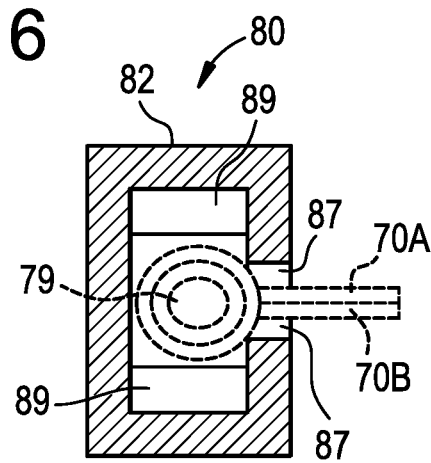
FIG. 6 is a cross-sectional view of the frame member of the fluid dispensing device of FIG. 5 taken along line 6-6.
Figure 7:
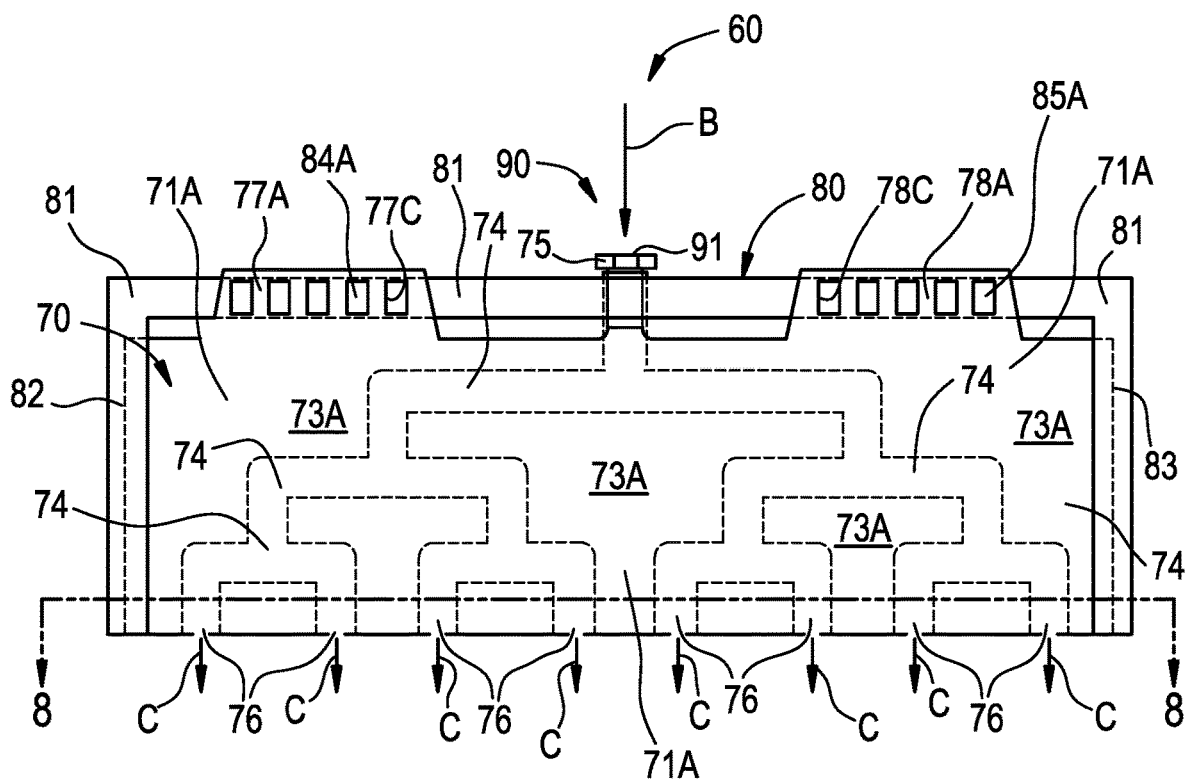
FIG. 7 is a front view showing one embodiment of a flexible film fluid-dispensing device useful in the continuous process of FIG. 3.
Figure 8:
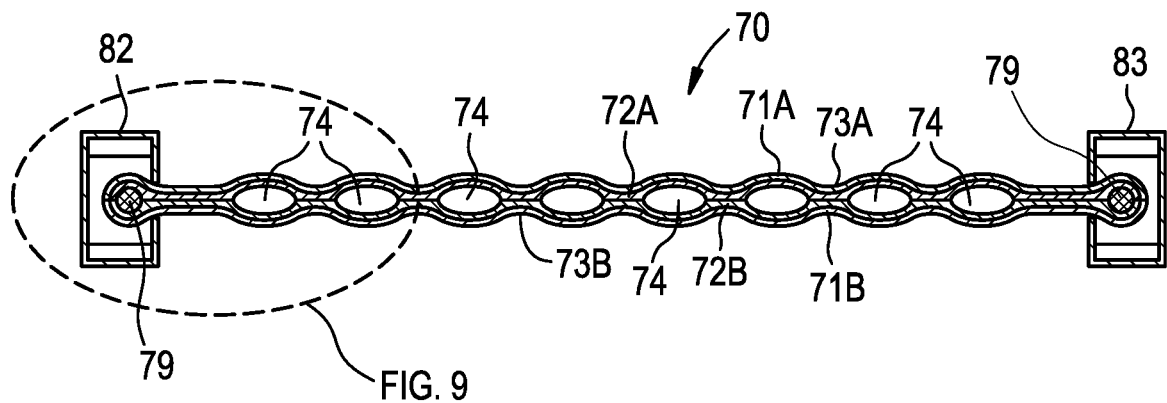
FIG. 8 is a cross-sectional view of the fluid dispensing device of FIG. 7 taken along line 8-8.
Figure 9:
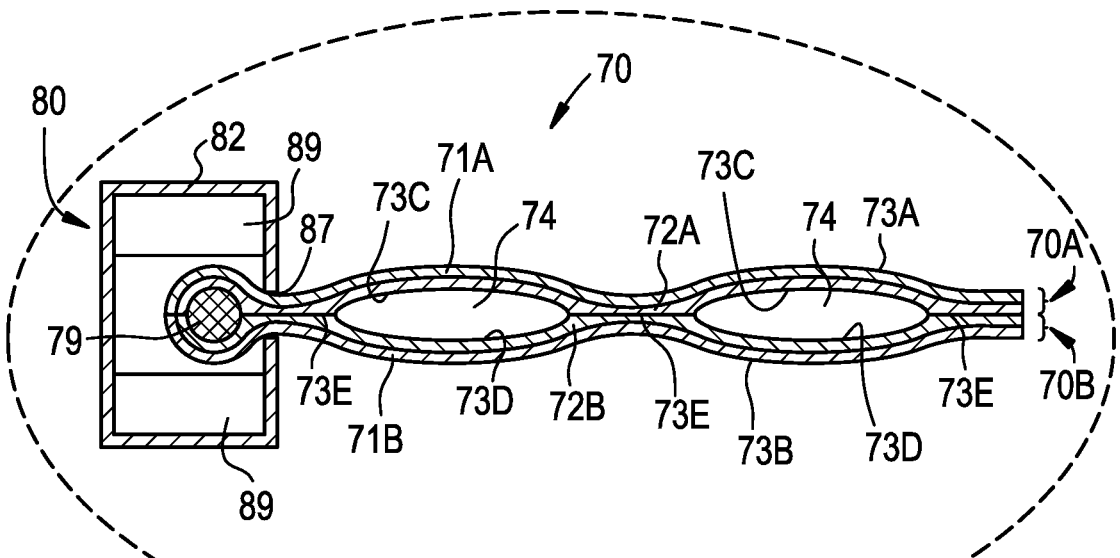
FIG. 9 is an enlarged partial view of a portion of the cross-sectional view of the flexible film fluid-dispensing device of FIG. 8 showing the ducts in a flexible film liner member of the flexible film fluid-dispensing device deflated when the flexible flim fluid-dispensing device is not in use, i.e., the ducts do not have any liquid fluid flowing inside the ducts.
Figure 10:
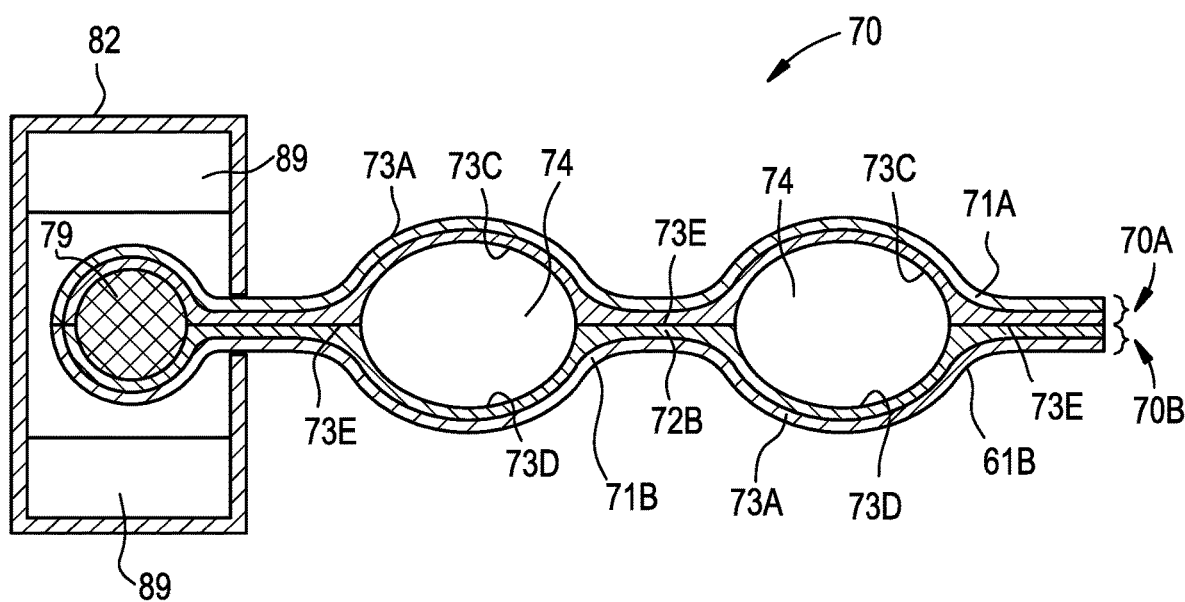
FIG. 10 is an enlarged partial view of a portion of the cross-sectional view of the flexible film fluid-dispensing device of FIG. 8 showing the ducts in the flexible film liner member of FIG. 9 being inflated when the flexible film fluid-dispensing device is in use, i.e., the ducts have liquid fluid flowing inside the ducts during usage of the flexible film fluid-dispensing device.

The rigid frame 80 of the dispenser 60 holds the flexible film liner 70 in place to receive the foam-forming fluid reactive mixture. With reference to FIGS. 4-7 again, there is shown one embodiment of a rigid frame member 80 including a U-shaped channel member 80 with an elongated base member 81 perpendicularly disposed between, and integral with, two elongated arms 82 and 83, wherein each arm 82 and 83 extends parallel to each other and each perpendicularly attached to opposite ends of the base 81 to form the U-shaped member 80 (when viewed in a front view). Members 81-83 can be made of tubular members of any shape or channel members. The U-shaped member 80 is used in an upside down position relative to the flexible film liner member 70. The edges of the liner 70 slide (as indicted by directional arrow Z) into the arm members 82 and 83 through slits 87 and 88 of the arms 82 and 83 respectively. The liner 70 is held in place by the rigid frame 80 via rod members 79 wherein once the liner 70 is in place by sliding into the frame 80, the liner 70 is firmly in place and will not come out of the slits from flowing forces of the fluid flowing in the ducts because the diameter of the rods is larger than the opening of the slits 87 and 88 as shown in FIG. 6 in dotted lines (phantom lines).

The dispenser 60 also includes at least one or more connection means or connector assemblies, generally indicated by reference number 90, for connecting the liner 70 and frame 80 to the outlet stream of a production line process. In a preferred embodiment, the connection means 90 is a hermetic junction assembly connected to a pipe of a mixing chamber or head 37 (shown in FIG. 3). In one embodiment, the flexible film dispenser 60 is attached to a line from the mixing head 37 via the hermetic connector assembly 90 such that a foam-forming fluid reactive mixture 61 can be: (1) fed into the dispenser 60 via inlet 75 in the direction indicated by directional arrow B in FIG. 7; (2) passed through the dispenser 60 via the ducts 74 and outlets 76 in the direction indicated by directional arrow C in FIG. 7; and (3) passed onto the surface area 45 of the moving bottom sheet substrate 44 in the foam-forming section 40 of the production line 20 shown in FIG. 3. As shown in FIG. 3, the dispenser 60 receives the foam-forming fluid reactive mixture from the mixing head 37; the reactive mixture passes through the ducts 74 of the dispenser 60; and the dispenser 60 distributes the foam-forming fluid reactive mixture 61 evenly and uniformly across the width of, and on the surface area 45 of, the moving bottom sheet 44.

One of the objectives of the present invention is to provide a process of making a panel article 10 using a novel flexible film dispenser 60 design such that the design of the dispenser 60 is technically superior in function to known prior art dispensers which provides the manufacture of an improved panel member. The superior industrial design of the dispenser 60 of the present invention is capable of readily dispensing an emulsion for PIR/PUR panel producers using the RFDBL continuous process.

When carrying out the process of the present invention, the temperatures used for processing, for example, PUR foam and PIR foam are different and can vary. In general, for example, when using metal sheet substrates as the facing layers in the process, the temperature of the metal sheets can vary between 20° C. and 80° C. in one embodiment, while the temperature of the component in the reactive mixture fluid can be between 20° C. and 40° C. in one embodiment. In addition, the mixing head 37 is operated at pressure of, for example, from 130 bar to 170 bar.

With reference to FIG. 3 again, there is shown a preferred embodiment of the process for forming a panel member 10 including, for example, the foam-forming fluid reactive mixture 61 flowing from the mixing head 37 through the dispenser 60 and exits the dispenser 60. The dispenser 60 dispenses the foam-forming reactive fluid from the mixing head 37 onto a moving bottom or lower sheet substrate 44. The bottom substrate moves in the direction indicated by directional arrow A in FIG. 3. A sufficient speed and time of the moving sheet 44 is used to allow the foam-forming fluid to react, as the fluid travels on the moving sheet 44 typically in a horizontal direction A, to form a foam inbetween a top sheet substrate (top layer) 41 and the bottom sheet substrate (bottom layer) 44. After the foam-forming reactive mixture is distributed onto sheet 44 and reacts to form a foam, the foam is allowed to contact the top and bottom layers and to fill in the gap between the top layer, such that the foam is integrally attached to the top and bottom layers forming a panel structure comprising the top sheet substrate 41, the bottom sheet substrate 44, and the foam material 48 disposed inbetween the top and bottom layers which ultimately becomes the middle layer 13 of the panel member 10. Once the foam expands and contacts the top and bottom layers toward the end of the process in section 40, the formed foamed panel is cut using a cutting tool 51 in the cutting section 50 of the process 20. The panels are cut into predetermined discrete panel sections 10 as shown in FIGS. 1-3.

Upon the substantially complete reaction of the fluid 61, a final foam material 48 is formed. The foam material 48 (forming the middle foam layer 13 of panel member 10) then forms an integral part of the final panel member 10 (as shown in FIG. 1). As shown in FIGS. 1-3, the top sheet substrate 41 forms the top layer 11 of the final panel member 10; the bottom sheet substrate 44 forms the bottom layer 12 of the final panel member 10; and the foam material 48 forms the middle foam layer 13 of the panel member 10. At the panel cutting section 50 of the process 20, the integral structure comprising the foam material 48 inbetween the top sheet 41 and bottom sheet 44 is cut, with a cutting instrument 51, into sections to form a plurality of panel members 10 which are then cooled, stacked and prepared for shipment or storage (not shown).

In a general embodiment, the flexible film dispenser 60 useful in the present invention has several advantageous over other known conventional dispensers including, for example, the dispenser: (1) can be made using a flexible film liner and not of a hard, inflexible, solid block or structure (e.g., a rake made of a metal pipe with holes or of any rigid material); (2) can be made using a heat sealable flexible film liner material; (3) has dimensions such as to cover an entire panel width; (4) has a flow path that provides an appropriate clearance between the dispenser and the moving bottom sheet substrate on which the reactive fluid mixture from the dispenser has flowed thereon; (5) can be made using a flexible film liner that can encompass one layer or multiple layers; and (6) can be made using a flexible film liner that can be laminated or coextruded.

Some of the advantageous properties exhibited by the panel member 10 made by the above-described process of the present invention can include, for example, the panel member 10 has: (1) a foam middle layer 13 that is homogeneous, and (2) a foam middle layer 13 that has a reduced density. For example, all the important properties of the foam middle layer 13, e.g. thermal conductivity, mechanical strength and density, can have a normalized standard deviation over the width of the panel from 0% to 15% in one embodiment, from 0% to 10% in another embodiment, and from 0% to 5% in still another embodiment. In addition, having a more uniform distribution of the foam-forming reactive mixture by the dispenser also provides a manufacturer the capability of reducing the overpacking, and therefore, the final density of the panel, which in turn has a beneficial impact on the final cost of the panel. For example, the overpacking of the foam middle layer can be from 0% to 5% in one embodiment, from 5% to 8% in another embodiment, and from 8% to 15% in still another embodiment.

One of the major applications of PUR and PIR insulation foams is in commercial buildings using steel sandwich panels or flexible-faced sandwich panels. The sandwich panels of the present invention are advantageously used in applications that require one or more of the following properties: thermal insulation, mechanical strength, fire retardancy, and building efficiency. In some embodiments, the sandwich panels of the present invention are useful in both industrial and residential applications, and can be used, for example, as wall and roof panels, for cold stores insulation, for doors, for windows for sliding shutters, and the like.

What is claimed is:

1. A process for manufacturing a multilayer foam panel member comprising the steps of:
   (A) providing at least a top sheet substrate;
   (B) providing at least a bottom sheet substrate
   (C) providing a flexible film fluid-dispensing device for dispensing a foam-forming reactive fluid mixture therefrom and that includes a flexible film liner and a rigid frame, the flexible film liner including a plurality of fluid inlet apertures, a plurality of fluid outlet apertures, and a plurality of flexible fluid flow path ducts, the rigid frame including arm members that extend parallel to each other, and the rigid frame being attached to edges of the flexible film liner and holding the flexible film liner in place to receive the foam-forming reactive fluid mixture;
   (D) dispensing the foam-forming reactive fluid mixture from the flexible film fluid-dispensing device onto a surface of the bottom sheet substrate, the foam-forming reactive fluid mixture entering the plurality of fluid inlet apertures, passing through the plurality of flexible fluid flow path ducts, and exiting the plurality of fluid outlet apertures onto the surface of the bottom sheet substrate distributing the foam-forming reactive fluid mixture exiting the flexible film fluid-dispensing device;
   (E) allowing the foam-forming reactive fluid mixture to react on the surface of the bottom sheet substrate, for a time sufficient to form a middle foam material substrate disposed inbetween, and integral with, the top sheet substrate and the bottom sheet substrate to form a multilayer panel structure; and
   (F) curing the panel structure to form a cured panel member.

2. The process of claim 1, wherein the process is a continuous process; wherein the bottom sheet substrate is moving in a horizontal plane direction; and wherein the process includes further the step of:
   (G) cutting the panel member of step (F) into a predetermined discrete panel section to form a multilayer panel member.

3. The process of claim 2, wherein the process comprises a double band lamination production process.

4. The process of claim 1, wherein the process is a discontinuous process; wherein the bottom sheet substrate is stationary or moving; the bottom sheet substrate is disposed in a mold; and wherein the process further includes the step of:
   (G) demolding the cured panel member of step (F) from the mold to form a multilayer foam panel member.

5. The process of claim 4, wherein the bottom sheet substrate in step (D) is disposed in a mold and the process comprises a molding production process.

6. The process of claim 1, wherein the edges of the flexible film liner slide into slits in the arm members of the rigid frame.

* * * * *